(12) United States Patent
Tanabe et al.

(10) Patent No.: US 9,845,393 B2
(45) Date of Patent: Dec. 19, 2017

(54) METHOD FOR PRODUCING ANTI-BLOCKING HARD COAT FILM

(71) Applicant: RIKEN TECHNOS CORPORATION, Tokyo (JP)

(72) Inventors: Ryoichi Tanabe, Tokyo (JP); Nozomu Washio, Tokyo (JP)

(73) Assignee: RIKEN TECHNOS CORPORATION (JP)

( * ) Notice: Subject to any disclaimer, the term of this patent is extended or adjusted under 35 U.S.C. 154(b) by 0 days.

(21) Appl. No.: 14/902,832

(22) PCT Filed: Jun. 17, 2014

(86) PCT No.: PCT/JP2014/065966
§ 371 (c)(1),
(2) Date: Jan. 4, 2016

(87) PCT Pub. No.: WO2015/001948
PCT Pub. Date: Jan. 8, 2015

(65) Prior Publication Data
US 2016/0194500 A1    Jul. 7, 2016

(30) Foreign Application Priority Data
Jul. 4, 2013  (JP) ................................. 2013-140335

(51) Int. Cl.
| | | |
|---|---|---|
| *C09D 4/00* | (2006.01) | |
| *C09D 7/06* | (2006.01) | |
| *C09D 7/12* | (2006.01) | |
| *G06F 3/041* | (2006.01) | |
| *B32B 15/09* | (2006.01) | |
| *B32B 27/36* | (2006.01) | |
| *B05D 3/06* | (2006.01) | |
| *C08K 5/541* | (2006.01) | |

(52) U.S. Cl.
CPC ................. *C09D 4/00* (2013.01); *B05D 3/06* (2013.01); *B32B 15/09* (2013.01); *B32B 27/36* (2013.01); *C09D 7/06* (2013.01); *C09D 7/12* (2013.01); *G06F 3/041* (2013.01); *B32B 2439/66* (2013.01); *C08K 5/541* (2013.01); *G06F 2203/04103* (2013.01)

(58) Field of Classification Search
CPC ... C09D 4/00; C09D 7/06; C09D 7/12; C08K 5/541
See application file for complete search history.

(56) References Cited

U.S. PATENT DOCUMENTS

| | | | | |
|---|---|---|---|---|
| 2006/0134400 A1* | 6/2006 | Takada | ................. | C08G 18/672 428/313.9 |
| 2006/0287408 A1* | 12/2006 | Baikerikar | ............ | C03C 17/007 522/71 |
| 2013/0065982 A1 | 3/2013 | Mitsuoka et al. | | |
| 2013/0115469 A1* | 5/2013 | Hayashi | ............... | C09D 7/1216 428/452 |
| 2013/0222906 A1 | 8/2013 | Tsunekawa et al. | | |
| 2014/0242395 A1* | 8/2014 | Takashima | ............. | C09D 7/125 428/423.1 |

FOREIGN PATENT DOCUMENTS

| | | |
|---|---|---|
| CN | 102947395 A | 2/2013 |
| CN | 103068571 A | 4/2013 |
| JP | 2002-060735 A | 2/2002 |
| JP | 2005-247939 A | 9/2005 |
| JP | 2005-288787 A | 10/2005 |
| JP | 2009-134077 A | 6/2009 |
| JP | 2010-082864 A | 4/2010 |
| JP | 2010-097011 A | 4/2010 |
| JP | 2010-163535 A | 7/2010 |
| JP | 2010-241937 A | 10/2010 |
| JP | 2011-039978 A | 2/2011 |
| JP | 2011-068034 A | 4/2011 |
| JP | 2011-201930 A | 10/2011 |
| JP | 2011-201931 A | 10/2011 |
| JP | 2012-027401 A | 2/2012 |
| JP | 2012-093570 A | 5/2012 |
| JP | 2012-128157 A | 7/2012 |
| JP | 2012-140533 A | 7/2012 |
| JP | 2012-252275 A | 12/2012 |

OTHER PUBLICATIONS

PCT/JP2014/065966 International Search Report dated Sep. 22, 2014; 5pgs.
CN20140037545.8 Office Action dated Apr. 12, 2017; 15 pgs.

* cited by examiner

*Primary Examiner* — Margaret Moore

(74) *Attorney, Agent, or Firm* — Bracewell LLP; Brad Y. Chin

(57) ABSTRACT

Embodiments of invention provide a method for producing a hard coat film which has a hard coat that is formed from an active energy ray-curable resin composition on at least one surface of a film base. According to at least one embodiment, the active energy ray-curable resin composition used in this method contains (P) 100 parts by mass of a urethane (meth)acrylate compound, (Q) 0.02-5 parts by mass of organic fine particles having an average particle diameter of 10-300 nm, and (R) 0.0002-2 parts by mass of an acrylic silicone-based leveling agent. The method according to at least one embodiment includes the steps of (1) forming a wet coating film by applying the active energy ray-curable resin composition to the film base, (2) forming a dry coating film by drying the wet coating film, and (3) forming a hard coat film by curing the dry coating film by means of active energy ray irradiation at a temperature of 50-90° C.

5 Claims, 1 Drawing Sheet

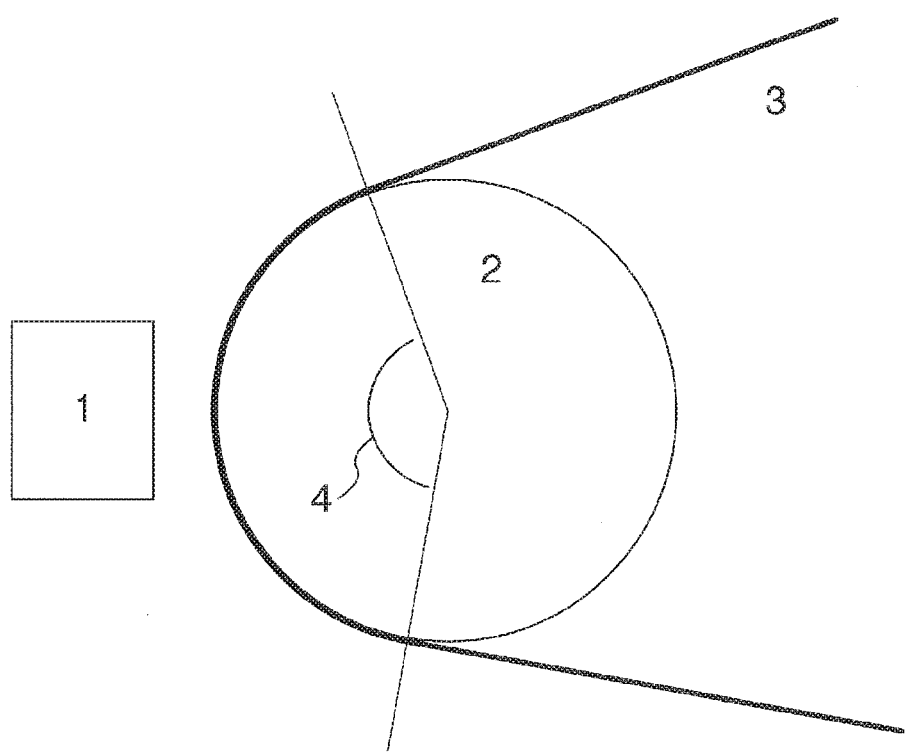

METHOD FOR PRODUCING ANTI-BLOCKING HARD COAT FILM

CROSS REFERENCE TO RELATED APPLICATION

This application claims the benefit of and priority to PCT/JP2014/065966 filed on Jun. 17, 2014, entitled (translation), "METHOD FOR PRODUCING ANTI-BLOCKING HARD COAT FILM," which claims the benefit of and priority to Chinese Patent Application No. 2013-140335 filed on Jul. 4, 2013, entitled (translation), "METHOD FOR PRODUCING ANTI-BLOCKING HARD COAT FILM," both of which are hereby incorporated by reference in their entirety into this application.

BACKGROUND

Field of the Invention

Embodiments of the invention relate to a method for producing an anti-blocking hard coat film. Embodiments of the invention more specifically relate to a method for producing a hard coat film which is excellent in anti-blocking properties and transparency and suitable as a member of a touch panel.

Description of the Related Art

In recent years, touch panels have become widespread, which are installed on image display devices, such as a liquid crystal display, a plasma display, and an electroluminescence display and allow input by touching with a finger, a pen, or the like, while observing a display. A member comprising a film base material, such as triacetyl cellulose or polyethylene terephthalate has been frequently used in a touch panel. It has been widely performed to form an abrasion resistant hard coat on the outermost surface on the touch surface side of the film base material so that scratches and the like caused by fingernails or a pen point during the operation of the touch panel do not occur.

Further, a transparent conductive laminate of a film base material and a transparent conductive film such as a metal oxide thin film of indium tin oxide or the like has been frequently used in the touch panel. It has been widely performed to form a hard coat or laminate a hard coat film on the transparent conductive laminate for the purpose of suppressing precipitation of oligomers from the film base material or the like or adjusting the reflection color or transmission color of the laminate.

In the production steps for forming a hard coat film by forming a hard coat on a film base material, for forming a hard coat on a transparent conductive laminate, and for laminating a transparent conductive laminate and a hard coat film, the laminated film may be stored in the state where it is wound in a roll form. Since the laminated film is left with the surface on the hard coat side and the back surface opposite to the hard coat surface being pressed with each other for a long time during the storage, the hard coat surface and the back surface are often strongly adhered. As a result, when the laminated film is withdrawn from a film roll, it cannot be smoothly withdrawn, or the hard coat of the laminated film may be broken.

As a technique of solving such disadvantage, a technique of incorporating fine particles into a coating material for forming a hard coat to provide unevenness on the hard coat surface to reduce the true contact area between the hard coat surface and the back surface is frequently used. However, in order to obtain sufficient anti-blocking properties, it is necessary to use particles having a relatively large size or use a large amount of fine particles, resulting in unsatisfactory transparency for a touch panel.

Thus, there have been proposed techniques of forming a coating film made of a coating material containing inorganic fine particles such as silica on the back surface opposite to the surface on the hard coat side of a film base material to provide unevenness on the back surface (for example, see JP 2011-039978 A and JP 2012-027401 A). However, in order to obtain sufficient anti-blocking properties, these techniques are required to incorporate particles having a relatively large size or to incorporate a large amount of fine particles into the coating material used for the anti-blocking coat. Even when such a coating film is formed on the back surface, there is a disadvantage that the transparency will be unsatisfactory for a touch panel. Further, since inorganic fine particles such as silica have high hardness, there is a disadvantage of the wear of a production apparatus. Further, since highly dispersed inorganic fine particles such as silica have high surface activity and strong adhesion force to metal, there will also be a disadvantage of requiring much labor in the operation of cleaning a coating roller or the like when a coating material containing inorganic fine particles such as silica adheres to the coating roller or the like.

Further, there has been proposed a technique of providing unevenness on the hard coat surface by phase separating the base resin of a coating material forming a hard coat (for example, see JP 2010-163535 A). However, since the effect of the technique is largely influenced by drying, temperature conditions, and the like during production, there is also a disadvantage that it is difficult to industrially stably produce such a hard coat film.

Further, there has been also proposed a technique of gathering an anti-blocking agent on the surface of a hard coat layer (for example, see JP 2010-241937 A). According to this technique, since sufficient anti-blocking properties can be obtained when a small amount of fine particles are used as an anti-blocking agent, transparency sufficient for displays can be secured. However, the technique of JP 2010-241937A is a technique in which "fine particles having a fluorine compound on the surface is used as an anti-blocking agent thereby bleeding the fine particles to the surface of a hard coat layer to effectively form surface unevenness with a small amount of fine particles and impart blocking resistance without reducing the physical properties and transparency of the hard coat layer". Therefore, this technique cannot be used for the purpose of suppressing precipitation of oligomers from a film base material or the like. Further, even when a conductive film such as an indium tin oxide thin film is intended to be laminated on the anti-blocking hard coat surface, it will be difficult to laminate the film with sufficient adhesion strength. Further, this film is not satisfactory in terms of stain resistance and fingerprint resistance as a film for touch panels operated by touching with a finger or the like.

SUMMARY

Embodiments of the invention provide a method for producing a hard coat film, which is excellent in anti-blocking properties and transparency and suitable as a member of a touch panel.

Embodiments of the invention provide a specific active energy ray-curable resin composition as a coating material for forming a hard coat under specific conditions.

Specifically, embodiments of the invention provide a method for producing a hard coat film having a hard coat formed from an active energy ray-curable resin composition on at least one surface of a film base material, wherein the active energy my-curable resin composition contains 100 parts by mass of (P) a urethane (meth)acrylate compound, 0.02 to 5 parts by mass of (Q) organic fine particles having an average particle size of 10 to 300 nm, and 0.0002 to 2 parts by mass of (R) an acrylic silicon leveling agent. According to at least one embodiment, the method includes the steps of: (1) coating the film base material with the active energy ray-curable resin composition to form a wet coating film, (2) drying the wet coating film to form a dry coating film, and (3) irradiating the dry coating film with an active energy ray at a temperature of 50 to 90° C. to cure the dry coating film to form the hard coat film.

Embodiments of invention provide a method for producing a hard coat film which has a hard coat that is formed from an active energy ray-curable resin composition on at least one surface of a film base. According to at least one embodiment, the active energy ray-curable resin composition used in this method contains (P) 100 parts by mass of a urethane (meth)acrylate compound, (Q) 0.02-5 parts by mass of organic fine particles having an average particle diameter of 10-300 nm, and (R) 0.0002-2 parts by mass of an acrylic silicone-based leveling agent. The method according to at least one embodiment includes the steps of (1) forming a wet coating film by applying the active energy ray-curable resin composition to the film base, (2) forming a dry coating film by drying the wet coating film, and (3) forming a hard coat film by curing the dry coating film by means of active energy ray irradiation at a temperature of 50-90° C.

According to at least one embodiment, a length of time after forming the wet coating film in the step (1) and before starting the step (2) is 3 to 30 seconds.

According to at least one embodiment, there is provided a hard coat film produced by the method mentioned above and described in more detail below.

According to at least one embodiment, there is provided a touch panel including the hard coat film mentioned above and described in more detail below.

Various objects, advantages and features of the invention will become apparent from the following description of embodiments with reference to the accompanying drawings.

BRIEF DESCRIPTION OF THE DRAWINGS

These and other features, aspects, and advantages of the invention are better understood with regard to the following Detailed Description, appended Claims, and accompanying FIGURE. It is to be noted, however, that the FIGURE illustrates only various embodiments of the invention and are therefore not to be considered limiting of the invention's scope as it may include other effective embodiments as well.

FIG. 1 is a schematic diagram showing an example of temperature controllable ultraviolet irradiation means used in Example 1.

DETAILED DESCRIPTION

Embodiments of invention provide a method for producing a hard coat film having a hard coat formed from an active energy ray-curable resin composition on at least one surface of a film base material.

According to at least one embodiment, the active energy ray-curable resin composition (hereinafter sometimes referred to as a "coating material" or a "coating composition") can be polymerized/cured by an active energy ray, such as ultraviolet rays and electron beams to form a hard coat, and contains (P) a urethane (meth)acrylate compound, (Q) organic fine particles having an average particle size of 10 to 300 nm, and (R) an acrylic silicone leveling agent.

As follows, (meth)acrylate means acrylate or methacrylate. Further, a (meth)acryloyl group means an acryloyl group or a methacryloyl group.

According to at least one embodiment, the component (P) is a compound having a urethane bond and a (meth)acryloyl group, and has a characteristic feature that the curing reaction is fast when it is irradiated with an active energy ray to be cured. The production method, according to various embodiments of the invention, includes a step of irradiating the active energy ray-curable resin composition with an active energy ray at a temperature of 50 to 90° C. to cure the composition. Therefore, a coating composition in which the curing reaction is fast is preferred. When the active energy ray-curable resin composition contains the component (P), a fast curing reaction is achieved.

According to at least one embodiment, the component (P) may also have a functional group other than the urethane bond and the (meth)acryloyl group. Examples of the functional group other than the urethane bond and the (meth)acryloyl group include a hydroxy group, a carboxyl group, a phenyl group, a thiol group, a phosphate group, an epoxy group, halogen, an ether bond, and an ester bond.

Examples of the component (P) include a polyurethane (meth)acrylate and a urethane (meth)acrylate oligomer. Commercially available examples include, for example, polyfunctional polyurethane acrylates "Beam Set 575 (trade name)" and "Beam Set 575CB (trade name)" by Arakawa Chemical Industries, Ltd., and a urethane (meth)acrylate oligomer "CN Series (trade name)" by Sartomer Japan, Inc. One of these compounds or a mixture of two or more of these compounds can be used as the component (P).

According to at least one embodiment, the component (Q) is organic fine particles having an average particle size of 10 to 300 nm. The "organic fine particles" of the component (Q) referred to therein are not particularly limited as long as they are an organic compound having an average particle size within a predetermined range. The component (Q) acts so as to impart suitable anti-blocking properties to a hard coat formed from the active energy ray-curable resin composition. Therefore, the average particle size of the component (Q) is required to be a predetermined size or more. Specifically, the average particle size of the component (Q) needs to be 10 nm or more. The average particle size may be preferably 80 nm or more, more preferably 120 nm or more.

On the other hand, in order to maintain the transparency of the hard coat, the average particle size of the component (Q) is required to be a predetermined size or less. Specifically, the average particle size of the component (Q) needs to be 300 nm or less. The average particle size is preferably 250 nm or less, more preferably 200 nm or less.

When an anti-blocking agent is present on or in the vicinity of the surface of the hard coat, it develops a large effect, but when it is completely buried in the inner part of the hard coat, it hardly develops the effect. Therefore, in order to develop suitable anti-blocking properties with a smaller loading, it is preferred to use an anti-blocking agent which easily gathers on or in the vicinity of the surface of the hard coat. The component (Q) which is the organic fine particles contained in the active energy ray-curable resin composition has characteristics of easily gathering on or in the vicinity of the surface of the hard coat. Therefore, the component (Q) is preferably used as an anti-blocking agent.

While not wishing to be bound by any specific theory, it is considered that the organic fine particles easily gather on or in the vicinity of the surface of the hard coat because the fine particles have a small specific gravity and properties of floating on the surface of a wet coating film.

According to at least one embodiment, examples of the component (Q) include, but are not particularly limited to, resin beads of styrenic resins, acrylic resins, polycarbonate resins, polyester resins, ethylene resins, propylene resins, fluorine-containing resins, and cured resins of amino compounds and formaldehyde. Among these, fine particles of crosslinked acrylic resins are preferred because these particles easily gather on or in the vicinity of the surface of the hard coat and are excellent in transparency and solvent resistance. One of these fine particles or a mixture of two or more of these fine particles can be used as the component (Q).

Commercially available examples of the component (Q) include crosslinked or uncrosslinked acrylic resin fine particles "ADVANCELL NS (trade name)" by Sekisui Chemical Co., Ltd., crosslinked acrylic resin fine particles "UJ Series (trade name)" and "DJ Series (trade name)" by Toagosei Co., Ltd., and crosslinked acrylic resin fine particles "ENEOS Uni-Powder (trade name)" by JX Nippon Oil & Energy Corporation.

Note that the average particle size of fine particles referred to therein is a particle size at which 50% by mass of particles from the finest particle side are accumulated in a particle size distribution curve determined by a laser diffraction/scattering method. This average particle size is, for example, measured using a laser diffraction/scattering particle size analyzer "MT3200II (trade name)" by Nikkiso Co., Ltd.

According to at least one embodiment, the lower limit of the loading of the component (Q) can be determined from the point of view of securing anti-blocking properties of the hard coat film. In the hard coat film obtained by the production method, according to various embodiments of the invention, the anti-blocking agent is concentrated on or in the vicinity of the surface of the hard coat. Therefore, the loading of the component (Q) that is required at the minimum for the development of anti-blocking properties can be expressed by the mass (q) of the component (Q) in a coating composition required for forming 1 $m^2$ of the hard coat. As shown in Table 2 with respect to Examples to be described below, the mass (q) may be at least 10 mg, preferably 15 mg or more. Therefore, although there is some up and down depending on the amount of optional components in the coating composition, when the thickness of the hard coat after curing is set to 2 μm, the loading of the component (Q) may be 0.5 parts by mass or more, preferably 0.8 parts by mass or more, based on 100 parts by mass of the component (P); when the thickness is set to 10 μm, the loading of the component (Q) may be 0.1 part by mass or more, preferably 0.16 parts by mass or more; and when the thickness is set to 50 μm, the loading of the component (Q) may be 0.02 parts by mass or more, preferably 0.032 parts by mass or more.

On the other hand, the upper limit of the loading of the component (Q) can be determined from the point of view of securing the transparency of a hard coat film. The upper limit of the loading of the component (Q) may be 5 parts by mass or less, preferably 3 parts by mass or less, based on 100 parts by mass of the component (P).

According to at least one embodiment, the component (R) is an acrylic silicon leveling agent and has properties that the polarity and the surface tension are a little lower than those of the component (P). The component (R) satisfactorily disperses the component (Q) in a coating composition and acts so that the component (Q) easily gather on or in the vicinity of the surface of the hard coat. The "acrylic silicon leveling agent" of the component (R) referred to therein is not particularly limited as long as it is a leveling agent that generates the above action, has an acrylic group (or methacrylic group), and contains silicon.

According to at least one embodiment, the lower limit of the loading of the component (R) can be determined from the point of view of dispersing the component (Q) in a coating composition to obtain the effect of allowing the component (Q) to easily gather on or in the vicinity of the surface of the hard coat. The lower limit of the loading of the component (R) may be 1 part by mass or more, preferably 3 parts by mass or more, based on 100 parts by mass of the component (Q). When the loading of the component (R) is 1 part by mass or more based on 100 parts by mass of the component (Q), the component (Q) is dispersed to provide sufficient effect of allowing the component (Q) to easily gather on or in the vicinity of the surface of the hard coat, thus capable of obtaining satisfactory anti-blocking properties.

According to at least one embodiment, the ratio of the lower limit loading of the component (R) to the loading of the component (P) can be determined by taking the influence of the amount of optional components in the coating composition or the thickness of the hard coat as described above into consideration. For example, when the thickness of the hard coat after curing is 2 μm, the loading of the component (Q) expressed in terms of solids is 0.5 parts by mass or more, preferably 0.8 parts by mass or more, based on 100 parts by mass of the component (P). Therefore, the loading of the component (R) may be 0.005 parts by mass or more, preferably 0.008 parts by mass or more, more preferably 0.015 parts by mass or more, and most preferably 0.024 parts by mass or more. Similarly, when the thickness of the hard coat after curing is 50 μm, the loading of the component (Q) is 0.02 parts by mass or more, preferably 0.032 parts by mass or more, based on 100 parts by mass of the component (P). Therefore, the loading of the component (R) may be 0.0002 parts by mass or more, preferably 0.00032 parts by mass or more, more preferably 0.0006 parts by mass or more, and most preferably 0.00096 parts by mass or more.

On the other hand, the upper limit of the loading of the component (R) can be determined so that, in the annealing step before laminating the hard coat film with a conductive film such as an indium tin oxide thin film, the leveling agent may not bleed out to the hard coat surface to reduce the adhesion between the hard coat and the conductive film. The upper limit of the loading of the component (R) may be 2 parts by mass or less, preferably 1 part by mass or less, based on 100 parts by mass of the component (P).

Commercially available examples of such an acrylic silicon leveling agent include "Disparlon UVX272 (trade name)", "Disparlon UVX2280 (trade name)", "Disparlon UVX2285 (trade name)", "Disparlon AQ7120 (trade name)", "Disparlon AQ7180 (trade name)", and "Disparlon LHP810 (trade name)", all by Kusumoto Chemicals, Ltd. Note that since these commercially available products are diluted with a solvent, these products can be used in an amount converted so that the amount of the acrylic silicon leveling agent (solids) may be within the above range.

In order to satisfactorily proceed the curing reaction by an active energy ray, the above active energy ray-curable resin composition preferably contains a compound (S) having two or more isocyanate groups (—N=C=O) in one molecule and/or a photopolymerization initiator (T).

According to at least one embodiment, examples of the compound (S) having two or more isocyanate groups in one molecule include methylenebis-4-cyclohexyl isocyanate; polyisocyanates such as a trimethylolpropane adduct of tolylene diisocyanate, a trimethylolpropane adduct of hexamethylene diisocyanate, a trimethylolpropane adduct of isophorone diisocyanate, an isocyanurate of tolylene diisocyanate, an isocyanurate of hexamethylene diisocyanate, an isocyanurate of isophorone diisocyanate, and a biuret of hexamethylene diisocyanate; and urethane crosslinking agents such as a block-type isocyanate of the above polyisocyanates. These can be used singly or in combination of two or more. Further, in the case of crosslinking, a catalyst such as dibutyltin dilaurate and dibutyltin diethylhexoate may be added to the active energy ray-curable resin composition as needed.

According to at least one embodiment, examples of the photopolymerization initiator (T) include benzophenone compounds such as benzophenone, methyl-o-benzoylbenzoate, 4-methylbenzophenone, 4,4'-bis(diethylamino)benzophenone, methyl o-benzoylbenzoate, 4-phenylbenzophenone, 4-benzoyl-4'-methyldiphenyl sulfide, 3,3',4,4'-tetra(tert-butylperoxycarbonyl)benzophenone, and 2,4,6-trimethylbenzophenone; benzoin compounds such as benzoin, benzoin methyl ether, benzoin ethyl ether, benzoin isopropyl ether, and benzyl methyl ketal; acetophenone compounds such as acetophenone, 2,2-dimethoxy-2-phenylacetophenone, and 1-hydroxycyclohexyl phenyl ketone; anthraquinone compounds such as methylanthraquinone, 2-ethylanthraquinone, and 2-amylanthraquinone; thioxanthone compounds such as thioxanthone, 2,4-diethylthioxanthone, and 2,4-diisopropylthioxanthone; alkylphenone compounds such as acetophenone dimethylketal; triazine compounds; biinmidazole compounds; acylphosphine oxide compounds; titanocene compounds; oxime ester compounds; oxime phenylacetate compounds; hydroxyketone compounds; and aminobenzoate compounds. These can be used singly or in combination of two or more.

The active energy ray-curable resin composition can further contain other components in addition to the components (P), (Q), (R), (S), and (T) within a range that does not adversely affect the purpose of the present invention.

According to at least one embodiment, examples of other components include one or more selected from (meth)acryloyl group-containing prepolymers or oligomers such as a polyester(meth)acrylate, a polyacrylic (meth)acrylate, an epoxy (meth)acrylate, a polyalkylene glycol poly(meth)acrylate, and a polyether (meth)acrylate; (meth)acryloyl group-containing monofunctional reactive monomers such as methyl (meth)acrylate, ethyl (meth)acrylate, n-butyl (meth)acrylate, hexyl (meth)acrylate, 2-ethylhexyl (meth)acrylate, lauryl (meth)acrylate, isobornyl (meth)acrylate, dicyclopentenyl (meth)acrylate, dicyclopentenyloxyethyl (meth)acrylate, phenyl (meth)acrylate, phenyl cellosolve (meth)acrylate, 2-methoxyethyl (meth)acrylate, hydroxyethyl (meth)acrylate, hydroxypropyl (meth)acrylate, 2-acryloyloxyethyl hydrogen phthalate, dimethylaminoethyl (meth)acrylate, trifluoroethyl (meth)acrylate, and trimethylsiloxyethyl methacrylate; monofunctional reactive monomers such as N-vinyl pyrrolidone and styrene; (meth)acryloyl group-containing bifunctional reactive monomers such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethylene oxyphenyl)propane, and 2,2'-bis(4-(meth)acryloyloxypolypropylene oxyphenyl)propane; (meth)acryloyl group-containing trifunctional reactive monomers such as trimethylolpropane tri(meth)acrylate and trimethylolethane tri(meth)acrylate; (meth)acryloyl group-containing tetrafunctional reactive monomers such as pentaerythritol tetra(meth)acrylate; and (meth)acryloyl group-containing hexafunctional reactive monomers such as dipentaerythritol hexaacrylate. Further examples include resins using one or more of the above monomers as constituent monomers.

According to at least one embodiment, the active energy ray-curable resin composition may optionally contain one or two or more additives such as an antioxidant, a weatherability stabilizer, a light-resistant stabilizer, an ultraviolet absorber, a heat stabilizer, an antistatic agent, a surfactant, a coloring agent, and a thixotropy-imparting agent.

According to at least one embodiment, the active energy ray-curable resin composition may optionally contain a solvent in order to be diluted to a concentration that allows easy application. The solvent is not particularly limited as long as it does not react with a component of the active energy ray-curable resin composition or other optional components, or it does not catalyze (accelerate) the self-reaction (including degradation reaction) of these components. Examples of the solvent that can be used include known solvents such as 1-methoxy-2-propanol, n-butyl acetate, toluene, methyl ethyl ketone, methyl isobutyl ketone, ethyl acetate, and diacetone alcohol.

According to at least one embodiment, the active energy ray-curable resin composition is obtained by mixing and stirring these components.

The production method, according to various embodiments of the invention, includes the step of (1) coating a film base material with the above active energy ray-curable resin composition to form a wet coating film.

According to at least one embodiment, the thickness of the wet coating film may be, but is not particularly limited to, for example, 0.5 µm to 100 µm corresponding to the desired thickness of hard coat.

A method of coating a film base material with the active energy ray-curable resin composition is not particularly limited, but a known web coating method can be used. Specific examples include methods, such as roll coating, gravure coating, reverse coating, roll brushing, spray coating, air knife coating, and die coating.

According to at least one embodiment, the film base material is not particularly limited as long as it has high transparency, and an arbitrary transparent resin film can be used for the film base material. Among them, a film excellent also in smoothness, heat resistance, mechanical strength, rigidity, and surface hardness is suitably used.

According to at least one embodiment, examples of such a transparent resin film include a film of a thermoplastic resin such as a cellulose ester resin such as triacctyl cellulose, a polyester resin such as polyethylene terephthalate, a cyclic hydrocarbon resin such as an ethylene-norbornene copolymer, an acrylic resin, an aromatic polycarbonate resin, a polyamide resin, a polyarylate resin, a polymer-type urethane acrylate resin, and a polyimide resin. Further, the transparent resin film include a non-oriented film, a uniaxially-oriented film, and a biaxially-oriented film.

According to at least one embodiment, the thickness of the transparent resin film as a film base material is not particularly limited, but is preferably 10 to 1000 µm. When the thickness of the transparent resin film is 10 µm or more, sufficient rigidity can be secured. Further, when the thickness of the transparent resin film is 1000 µm or less, the coating can be performed using a known web coating method and apparatus. The thickness of the transparent resin film is more preferably 20 to 250 µm.

According to at least one embodiment, a laminate of the above transparent resin film and one layer or two or more layers of any optical functional film and/or one layer or two or more layers of any transparent conductive film may be used as a film base material.

According to at least one embodiment, an anchor coat may be provided on the surface of the film base material before coating the film base material with the above active energy ray-curable resin composition in order to increase the adhesive strength with the hard coat.

According to at least one embodiment, an anchor coat agent for forming the anchor coat is not particularly limited as long as it is well dissolved in a known solvent such as 1-methoxy-2-propanol, n-butyl acetate, toluene, methyl ethyl ketone, methyl isobutyl ketone, ethyl acetate, and acetone, and sufficient anchor effect can be obtained. Examples of the anchor coat agent that can be used include conventional polyester, acrylic, polyurethane, acrylic urethane, and polyester polyurethane anchor coat agents. Commercially available examples of the anchor coat agent include "VYLON 24SS (trade name)" by Toyobo Co., Ltd. and "AU2141NT (trade name)" by TOKUSHIKI Co., Ltd.

According to at least one embodiment, for providing an anchor coat, the surface of a film base material is coated with an anchor coat agent by a conventional method to form an anchor coat, and the anchor coat can be coated with the above active energy ray-curable resin composition to form the hard coat.

According to at least one embodiment, the thickness of the anchor coat is not particularly limited, but may generally be about 0.01 to 5 μm. The thickness is preferably 0.05 to 2 μm.

According to at least one embodiment, a method of coating with an anchor coat agent is not particularly limited, but a known web coating method can be used. Specific examples include methods such as roll coating, gravure coating, reverse coating, roll brushing, spray coating, air knife coating, and die coating.

According to at least one embodiment, the production method of the present invention includes the step of (2) drying the wet coating film to form a dry coating film.

According to at least one embodiment, the method of drying the wet coating film is not particularly limited. The drying can be performed, for example, at a temperature of 30 to 120° C. for a time period of about 3 to 120 seconds. The lower limit of the drying temperature may be more preferably 40° C. or more, further preferably 50° C. or more.

When the active energy ray-curable resin composition is applied to a film base material, the component (Q) is in the state of being uniformly dispersed in the resin composition. Therefore, according to various embodiments, it is preferred to secure the time for the component (Q) to gather on or in the vicinity of the surface of the wet coating film before drying. For the purpose of securing the gathering time, the length of time after forming the wet coating film in the step (1) and before starting drying in the step (2) (for example, industrially, the length of time required for conveyance of a web from a coating head position to the entrance of a drying furnace) is preferably 3 seconds or more. This length of time is more preferably 5 seconds or more. Note that if the entrance of the drying path is brought close to the coating head by extending the drying path, the residence time in the drying path will be extended, and it will be possible to dry the web at a lower temperature. However, if the entrance of the drying path is brought excessively close to the coating head, the maintenance such as cleanup operation of the coating head will tend to be troublesome. Thus, the length of time after forming the wet coating film in the step (1) and before starting drying in the step (2) is preferably 3 seconds or more also from the point of view of working efficiency and production cost.

On the other hand, this length of time is preferably at most about 30 seconds from the point of view of the production efficiency with respect to the steps (1) and (2).

According to at least one embodiment, the drying temperature in the drying step is set to a temperature generally equal to the temperature in the curing step (3) to follow in order to facilitate the temperature control of the step (3).

The production method, according to various embodiments of the invention, includes the step of (3) irradiating the dry coating film with an active energy ray at a temperature of 50 to 90° C. to cure the dry coating film to form a hard coat film.

Conventionally, the step of irradiating a coating film of the active energy ray-curable resin composition with an active energy ray such as ultraviolet rays to cure the coating film has been performed in the vicinity of ordinary temperatures. This is because if the coating film is heated, the rigidity of the film base material will be reduced to easily cause trouble such as generation of wrinkles on the hard coat film.

Irrespective of the trouble, as a result of the investigation of temperature conditions in the curing step, embodiments of the invention demonstrate that the anti-blocking properties of the hard coat film is largely improved under specific temperature conditions.

In order to obtain the improvement effect of the anti-blocking properties of the hard coat film, the temperature in the curing step needs to be 50° C. or more. The temperature in the curing step is preferably 60° C. or more. On the other hand, the upper limit of the temperature in the curing step is preferably set in consideration of keeping the rigidity of the film base material at a satisfactory level and suppressing occurrence of trouble such as wrinkles on the hard coat film. The temperature in the curing step is set according to the type of the film base material, and when the film base material is a biaxially-oriented polyethylene terephthalate film, the temperature is generally preferably set to 90° C. or less. The temperature in the curing step is preferably 80° C. or less.

The method of controlling the temperature conditions in the curing step, according to at least one embodiment, is not particularly limited, but can be performed by an arbitrary method. Examples include a method of allowing a roll placed in opposition to an active energy ray irradiation apparatus to hold the laminate obtained in the step (2) as shown in FIG. 1 according to Examples thereby controlling the surface temperature of the roll to a predetermined temperature; and a method of enclosing the surroundings of an active energy ray irradiation apparatus as an irradiation furnace thereby controlling the temperature in the irradiation furnace to a predetermined temperature.

According to at least one embodiment, irradiation of the active energy ray can be performed using an arbitrary apparatus. For example, an apparatus using a high pressure mercury lamp, a metal-halide lamp, or the like as a light source can be used. Further, the amount of irradiation of the active energy ray may be suitably adjusted according to the curing characteristics of the active energy ray-curable resin composition as a coating material for forming a hard coat to be used. The amount of irradiation may generally be 100 to 10000 mJ/cm$^2$.

According to at least one embodiment, the thickness of the hard coat obtained as described above is preferably 0.5

µm or more. When the thickness of the hard coat is 0.5 µm or more, the improvement effect of scratch resistance can sufficiently be obtained. On the other hand, the thickness of the hard coat does not particularly have the upper limit. From the point of view of cost suppression, the thickness of the hard coat may be at most 50 µm.

EXAMPLES

Embodiments of the invention will be hereinafter described with reference to Examples, but the various embodiments of the invention are not limited to these Examples.

Measuring Methods of Physical Properties (i) Anti-Blocking Properties

Two test pieces each having a size of 20 cm in length×12 cm in width were cut out from a hard coat film so that the longitudinal direction could be the machine direction of the hard coat film. The two test pieces were superposed so that the hard coat surface of one test piece and the back surface opposite to the hard coat surface of the other test piece could face each other. A stainless steel plate having a size of 10 cm in length×10 cm in width and a mass of 1000 g was put on the central part of the superposed test pieces (load: 10 g/cm$^2$), and the test pieces were allowed to adhere to each other at a temperature of 90° C. for 10 minutes. Then, the test pieces were subjected to T-shaped peeling by hand and evaluated by the following criteria ⊚: Not adhered at all.

○: Slightly adhered, but if one of the shorter sides of the upper test piece is raised, the lower test piece will be separated and fall by its own weight.

Δ: Adhered, and if one of the shorter sides of the upper test piece is raised, the lower test piece will also be raised. However, no unusual sound occurs.

x: Strongly adhered, and an unusual sound will occur when the test pieces are subjected to T-shaped peeling.

(ii) Total Light Transmittance

Total light transmittance was measured using a turbidity meter "NDH2000" (trade name) by Nippon Denshoku Industries Co., Ltd. according to JIS K7361-1:1997.

(iii) Haze

Haze was measured using a turbidity meter "NDH2000" (trade name) by Nippon Denshoku Industries Co., Ltd. according to JIS K7136:2000.

(iv) Stain Resistance (Oil-Based Marker)

The hard coat surface of a hard coat film was subjected to spot staining with a red oil-based marker, and then the stained portion was covered with a watch glass and allowed to stand at room temperature for 24 hours.

Next, the stained portion was wiped and cleaned with Kimwipes (trade name) sufficiently containing isopropyl alcohol until the Kimwipes was not additionally stained. Then, the above portion was visually observed and evaluated by the following criteria.

⊚: No stain.

○: Stain remains slightly.

Δ: Stain remains considerably.

x: Stain remains significantly.

(v) Stain Resistance (Aqueous Marker)

The hard coat surface of a hard coat film was subjected to spot staining with a red aqueous marker, and then the stained portion was covered with a watch glass and allowed to stand at room temperature for 24 hours.

Next, the stained portion was sufficiently washed with running water and then wiped and cleaned with Kimwipes (trade name) sufficiently containing tap water until the Kimwipes was not additionally stained. Then, the above portion was visually observed and evaluated by the following criteria.

⊚: No stain.

○: Stain remains slightly.

Δ: Stain remains considerably.

x: Stain remains significantly.

(vi) Fingerprint Resistance

A hard coat film was bonded to the operating surface of the touch panel of a personal digital assistant "iPad (trade name)" provided with a capacitance type touch panel by Apple Inc. so that the hard coat could serve as a touch surface. The personal digital assistant was operated for 5 minutes and then visually observed whether or not fingerprints were conspicuous.

The test was performed by 10 persons. The case where fingerprints were conspicuous was rated as 0 point, and the case where fingerprints were inconspicuous was rated as 1 point. The scores of the 10 persons were summed up and evaluated by the following criteria.

⊚: 8 to 10 points

Δ: 4 to 7 points x: 0 to 3 points (vii) Abrasion Resistance

A sample having a size of 200 mm in length×25 mm in width was taken so that the longitudinal direction might be the machine direction of the hard coat film, and the sample was placed on a Gakushin Tester according to JIS L0849 so that the hard coat could form the surface. Subsequently, a #0000 steel wool was attached to the friction terminal of the Gakushin Tester; a load of 250 g (1 cm×1 cm) was then placed; and the surface of the test piece was reciprocatingly rubbed 10 times.

The resulting surface was visually observed and evaluated by the following criteria.

⊚: No scratches are observed.

○: 1 to 5 scratches are observed.

Δ: 6 to 10 scratches are observed.

x: 11 scratches or more are observed.

(viii) Pencil Hardness

The hardness of the hard coat surface was evaluated using a pencil "Uni" (trade name) by Mitsubishi Pencil Co., Ltd. under a load of 750 g according to JIS K5600-5-4.

(ix) Adhesion with Transparent Conductive Thin Film

A hard coat film was annealed at 80° C. for 1 hour, and on the surface of the hard coat was formed a transparent conductive thin film (having a thickness of 20 nm) made of an indium-tin composite oxide using a direct current magnetron sputtering method. Indium oxide containing 10% by mass of tin oxide was used as the target; the direct current power to be applied was set to 1.0 kW; the center roll temperature was set to 23° C.; and the argon gas partial pressure during sputtering was set to 0.67 Pa. Further, a very small amount of oxygen gas was passed so that a surface resistance value could be the minimum, the partial pressure of the oxygen gas being 7.5×10$^{-3}$ Pa.

Next, a co-extruded film (overall thickness: 100 µm, layer ratio: ionomer/polyethylene/polyethylene=1/2/1) was formed from a zinc ionomer "Himilan 1650 (trade name)" by Du Pont-Mitsui Polychemicals Co., Ltd. and polyethylene "Evolue 4030 (trade name)" by Prime Polymer Co., Ltd. using a film production apparatus equipped with an extruder and a multilayered T die.

Subsequently, a strip-shaped test piece A having a size of 100 mm in length×20 mm in width was cut out from the hard coat film obtained above in which the transparent conductive thin film was laminated so that the machine direction of the film could be the longitudinal direction of the sample. Similarly, a strip-shaped test piece B having a size of 100 mm in length×20 mm in width was cut out from the co-extruded film obtained above so that the machine direction of the film could be the longitudinal direction of the sample. Then, the transparent conductive thin film surface of the test piece A obtained above and the ionomer surface of the test piece B obtained above were heat-sealed at a temperature of 130° C. and a pressure of 0.5 MPa for a time period of 2 seconds with a sealing area of 10 mm in length×15 mm in width. The heat-sealed sample was subjected to conditioning at room temperature and 50% relative humidity for 24 hours and then measured for peel strength by a T-type peeling method at a testing rate of 200 mm. Note that the peeling occurred on the interface between the transparent conductive thin film and the hard coat in all the Examples and Comparative Examples.

Raw Materials Used (P) Urethane (meth)acrylate compound;

(P1) Tetrafunctional urethane acrylate "Beam Set 575CB (trade name)" by Arakawa Chemical Industries, Ltd.

(Q) Organic fine particles having an average particle size of 10 to 300 nm;

(Q1) Crosslinked acrylic resin fine particles "ADVANCELL NS K-001 (trade name)" having an average particle size of 150 nm by Sekisui Chemical Co., Ltd.

(R) Acrylic silicon leveling agent;

(R1) Acrylic silicon leveling agent "Disparlon UVX272 (trade name) by Kusumoto Chemicals, Ltd.

(S) Isocyanate;

(S1) Hexamethylene diisocyanate trimer "Coronate HX (trade name)" manufactured by Nippon Polyurethane Industry Co., Ltd.

(T) Photopolymerization initiator;

(T1) α-hydroxy acetophenone photopolymerization initiator "IRGACURE 127 (trade name)" by Ciba Japan. K.K.

Preparation of Active Energy Ray-Curable Resin Composition 1.5 parts by mass of (Q1), 0.2 parts by mass of (R1) (in terms of solids), 3 parts by mass of (T1), 40 parts by mass of methyl ethyl ketone, 40 parts by mass of methyl isobutyl ketone were mixed with 100 parts by mass of (P1) followed by stirring to prepare an active energy ray-curable resin composition.

Example 1

A description will be made with reference to FIG. 1.

A biaxially-oriented polyethylene terephthalate film "Lumirror U (trade name) having a thickness of 50 μm" by Toray Industries, Inc. as a film base material was coated with the active energy ray-curable resin composition obtained above using a gravure coating apparatus so that the thickness of the hard coat after curing could be 3 μm, and the coated film was dried at a temperature of 80° C. for 2 minutes to obtain a web 3. The web 3 was cured using a curing apparatus in which a high-pressure mercury-vapor lamp type ultraviolet irradiation apparatus 1 was placed in opposition to a specular metal roll 2 having a diameter of 25.4 cm (see FIG. 1) under the conditions of a specular metal roll temperature of 80° C., an amount of irradiation of 200 mJ/cm², a line speed of 15 m/min, and a holding angle (reference mark 4 in FIG. 1) of 120 degrees, and the resulting hard coat film was wound up on a winding tube. Note that the time period after forming a wet coating film of the active energy ray-curable resin composition and before starting drying of the coating film was 7 seconds. The above physical properties tests (i) to (ix) were performed after ageing for 24 hours at ordinary temperature. The results are shown in Table 1.

Example 2

A hard coat film was formed and measured for physical properties in the same manner as in Example 1 except that the specular metal roll temperature was changed to 60° C. The results are shown in Table 1.

Example 3

A hard coat film was formed and measured for physical properties in the same manner as in Example 1 except that the specular metal roll temperature was changed to 50° C. The results are shown in Table 1.

Reference Example 1

A hard coat film was formed and measured for physical properties in the same manner as in Example 1 except that the position of the entrance of the drying path was changed so that the time period after forming a wet coating film of the active energy ray-curable resin composition and before starting drying of the coating film could be 2 seconds. The results are shown in Table 1.

Comparative Example 1

A hard coat film was formed and measured for physical properties in the same manner as in Example 1 except that the specular metal roll temperature was changed to 30° C. The results are shown in Table 1.

Comparative Example 2

A hard coat film was formed in the same manner as in Example 1 except that the specular metal roll temperature was changed to 100° C.

A sample having good appearance was not able to be obtained because the rigidity of the film base material was reduced to wrinkle the hard coat film. Therefore, the tests of the above physical properties were omitted.

Example 4

A hard coat film was formed and measured for physical properties in the same manner as in Example 2 except that the active energy ray-curable resin composition further containing 3 parts by mass of the (S1) was used. The results are shown in Table 1.

Comparative Example 3

A hard coat film was formed and measured for physical properties in the same manner as in Example 1 except that the component (R1) was not used when the active energy ray-curable resin composition was prepared. The results are shown in Table 1.

Examples 5 to 10, Reference Example 2

Hard coat films were formed and measured for physical properties in the same manner as in Example 1 except that the formulation of the active energy ray-curable resin compositions to be used and the hard coat thickness were changed as shown in Table 2. The results are shown in Table 2.

the temperature in the step of irradiating a dry coating film with an active energy ray to cure the coating film was higher than the temperature range of 50 to 90° C. Comparative

TABLE 1

|  | Example 1 | Example 2 | Example 3 | Example 4 | Reference Example 1 | Comparative Example 1 | Comparative Example 2 | Comparative Example 3 |
|---|---|---|---|---|---|---|---|---|
| (P1) | 100 | 100 | 100 | 100 | 100 | 100 | 100 | 100 |
| (Q1) | 1.5 | 1.5 | 1.5 | 1.5 | 1.5 | 1.5 | 1.5 | 1.5 |
| (R1) | 0.2 | 0.2 | 0.2 | 0.2 | 0.2 | 0.2 | 0.2 | |
| (S1) | | | | 3 | | | | |
| (T1) | 3 | 3 | 3 | 3 | 3 | 3 | 3 | 3 |
| Methyl ethyl ketone | 40 | 40 | 40 | 40 | 40 | 40 | 40 | 40 |
| Methyl isobutyl ketone | 40 | 40 | 40 | 40 | 40 | 40 | 40 | 40 |
| Temperature in step (3) (° C.) | 80 | 60 | 50 | 60 | 80 | 30 | 100 | 80 |
| Time period between step (1) and (2) (s) | 7 | 7 | 7 | 7 | 2 | 7 | 7 | 7 |
| Remarks | | | | | | | Poor appearance | |
| (i) Anti-blocking properties | ⊚ | ⊚ | ○ | ⊚ | Δ | X | | X |
| (ii) Total light transmittance (%) | 93 | 93 | 93 | 93 | 93 | 93 | | 93 |
| (iii) Haze (%) | 0.2 | 0.2 | 0.2 | 0.2 | 0.2 | 0.2 | | 0.2 |
| (iv) Stain resistance (oil-based marker) | ⊚ | ⊚ | ⊚ | ⊚ | ⊚ | ⊚ | | ⊚ |
| (v) Stain resistance (aqueous marker) | ○ | ○ | ○ | ○ | ○ | ○ | | ○ |
| (vi) Fingerprint resistance | ⊚ | ⊚ | ⊚ | ⊚ | ⊚ | ⊚ | | ⊚ |
| (vii) Abrasion resistance | ⊚ | ⊚ | ⊚ | ⊚ | ⊚ | ⊚ | | ⊚ |
| (viii) Pencil hardness | 3H | 3H | 3H | 3H | 3H | 3H | | 3H |
| (ix) Adhesion (N/15 mm) | 2.2 | 2.1 | 2.1 | 2.1 | 2.2 | 2.1 | | 2.3 |

TABLE 2

|  | Example 5 | Example 6 | Example 7 | Example 8 | Example 9 | Example 10 | Reference Example 2 |
|---|---|---|---|---|---|---|---|
| (P1) | 100 | 100 | 100 | 100 | 100 | 100 | 100 |
| (Q1) | 3.0 | 1.5 | 1.5 | 0.80 | 0.21 | 0.21 | 0.21 |
| (R1) | 0.4 | 0.2 | 0.2 | 0.1 | 0.03 | 0.03 | 0.03 |
| (T1) | 3 | 3 | 3 | 3 | 3 | 3 | 3 |
| Methyl ethyl ketone | 40 | 40 | 40 | 40 | 40 | 40 | 40 |
| Methyl isobutyl ethyl ketone | 40 | 40 | 40 | 40 | 40 | 40 | 40 |
| Temperature in step (3) (° C.) | 80 | 80 | 80 | 80 | 80 | 80 | 80 |
| Concentration of organic fine particles (mass %) | 2.82 | 1.43 | 1.43 | 0.77 | 0.20 | 0.20 | 0.20 |
| Thickness of hard coat (μm) | 2 | 2 | 1 | 2 | 8 | 6 | 4 |
| Mass of organic fine particles (q) (mg) | 56 | 29 | 14 | 15 | 16 | 12 | 8 |
| (i) Anti-blocking properties | ⊚ | ⊚ | ○ | ⊚ | ⊚ | ○ | Δ |
| (ii) Total light transmittance (%) | 93 | 93 | 93 | 93 | 93 | 93 | 93 |
| (iii) Haze (%) | 0.2 | 0.2 | 0.2 | 0.2 | 0.2 | 0.2 | 0.2 |
| (iv) Stain resistance (oil-based marker) | ⊚ | ⊚ | ⊚ | ⊚ | ⊚ | ⊚ | ⊚ |
| (v) Stain resistance (aqueous marker) | ○ | ○ | ○ | ○ | ○ | ○ | ○ |
| (vi) Fingerprint resistance | ⊚ | ⊚ | ⊚ | ⊚ | ⊚ | ⊚ | ⊚ |
| (vii) Abrasion resistance | ⊚ | ⊚ | ⊚ | ⊚ | ⊚ | ⊚ | ⊚ |
| (viii) Pencil hardness | 3H | 3H | 3H | 3H | 3H | 3H | 3H |
| (ix) Adhesion (N/15 mm) | 2.2 | 2.1 | 2.1 | 2.1 | 2.1 | 2.0 | 2.1 |

The hard coat films obtained by the production method of the present invention were excellent in anti-blocking properties, transparency, stain resistance, fingerprint resistance, abrasion resistance, and pencil hardness, and the adhesion strength of each of the hard coat films with a transparent conductive film was at a satisfactory level.

On the other hand, Comparative Example 1 had poor anti-blocking properties because the temperature in the step of irradiating a dry coating film with an active energy ray to cure the coating film was lower than the temperature range of 50 to 90° C. Further, Comparative Example 2 was unable to provide a hard coat film having good appearance because Example 3 had poor anti-blocking properties because the component (R) was not used.

A hard coat film is obtained by a production method, according to various embodiments of the invention, which is excellent in anti-blocking properties and transparency. This hard coat film is also excellent in stain resistance, fingerprint resistance, and abrasion resistance. Therefore, this hard coat film can be suitably used for a protective film or the like of the display of a touch panel or the like.

Further, a transparent conductive laminate, which can be suitably used for the display of a touch panel or the like, can be obtained by laminating a hard coat film obtained by the production method, according to various embodiments of the invention, and a transparent conductive film.

According to at least one embodiment, the hard coat film produced, according to various embodiments of the invention, can be suitably used as a member of a touch panel, because it is excellent in anti-blocking properties and transparency.

According to at least one embodiment, FIG. 1 illustrates the following:
1: Ultraviolet irradiation apparatus
2: Specular metal roll
3: Web
4: Holding angle

The invention claimed is:

1. A method for producing a transparent hard coat film having a hard coat formed from an active energy ray-curable resin composition on at least one surface of a film base material, wherein the active energy ray-curable resin composition comprises:
 100 parts by mass of (P) a urethane (meth)acrylate compound;
 0.02 to 5 parts by mass of (Q) organic fine particles having an average particle size of 10 to 300 nm; and
 0.0002 to 2 parts by mass of (R) an acrylic silicon leveling agent,
 the method comprising the steps of:
 (1) coating the film base material with the active energy ray-curable resin composition to form a wet coating film;
 (2) drying the wet coating film in a drying path set at a temperature of 40° C. or more to form a dry coating film; and
 (3) irradiating the dry coating film with an active energy ray at a temperature of 50 to 90° C. to cure the dry coating film to form the hard coat film,
 wherein the (R) acrylic silicon leveling agent is loaded in the active energy ray-curable resin composition in an amount of 1 part by mass or more based on 100 parts by mass of the (Q) organic fine particles.

2. A hard coat film produced by the method according to claim 1.

3. A touch panel comprising the hard coat film according to claim 2.

4. A method for producing a hard coat film having a hard coat formed from an active energy ray-curable resin composition on at least one surface of a film base material, wherein the active energy ray-curable resin composition comprises:
 100 parts by mass of (P) a urethane (meth)acrylate compound;
 0.02 to 5 parts by mass of (Q) organic fine particles having an average particle size of 10 to 300 nm; and
 0.0002 to 2 parts by mass of (R) an acrylic silicon leveling agent,
 the method comprising the steps of:
 (1) coating the film base material with the active energy ray-curable resin composition to form a wet coating film;
 (2) drying the wet coating film in a drying path set at a temperature of 40° C. or more to form a dry coating film; and
 (3) irradiating the dry coating film with an active energy ray at a temperature of 50 to 90° C. to cure the dry coating film to form the hard coat film,
 wherein a length of time after forming the wet coating film in the step (1) and before starting the step (2) is 3 to 30 seconds.

5. The method according to claim 4, wherein the (R) acrylic silicon leveling agent is loaded in the active energy ray-curable resin composition in an amount of 1 part by mass or more based on 100 parts by mass of the (Q) organic fine particles.

* * * * *